United States Patent
Littlechild et al.

(10) Patent No.: US 7,248,145 B2
(45) Date of Patent: Jul. 24, 2007

(54) RADIO FREQUENCY IDENTIFICATION TRANSPONDER

(75) Inventors: Stuart Colin Littlechild, Stanmore (AU); Michael John Stanton, Cherrybrook (AU)

(73) Assignee: Magellan Technology Oty Limited, Annandale, New South Wales (AU)

( * ) Notice: Subject to any disclaimer, the term of this patent is extended or adjusted under 35 U.S.C. 154(b) by 537 days.

(21) Appl. No.: 10/204,159

(22) PCT Filed: Feb. 28, 2001

(86) PCT No.: PCT/AU01/00203

§ 371 (c)(1),
(2), (4) Date: Nov. 5, 2002

(87) PCT Pub. No.: WO01/65712

PCT Pub. Date: Sep. 7, 2001

(65) Prior Publication Data

US 2003/0112128 A1    Jun. 19, 2003

(30) Foreign Application Priority Data

Feb. 28, 2000 (AU) .................................. PQ5894

(51) Int. Cl.
*H04Q 5/22* (2006.01)
(52) U.S. Cl. ................................... 340/10.5
(58) Field of Classification Search .............. 340/10.5, 340/10.2, 10.32, 10.34, 10.51, 541; 235/375, 235/384; 341/173, 176; 342/42, 44, 50; 343/701; 365/222; 368/121, 9; 370/445; 701/200; 711/125
See application file for complete search history.

(56) References Cited

U.S. PATENT DOCUMENTS 4,121,102 A    10/1978 Wilson (Continued)

FOREIGN PATENT DOCUMENTS

EP    0427342    5/1991

(Continued)

OTHER PUBLICATIONS

Masashi Horiguchi, Member, IEEE; Takeshi Sakata, Member IEEE; and Kyioo Itoh, Senior Member, IEEE; Switched-Source-Impedance CMOS Circuit For Low Standby Sub-threshold Current Giga-Scale LSI's; IEEE Journal of Solid-State Circuits; Nov. 1993; pp. 1131-1135; vol. 28; No. 11.

*Primary Examiner*—Brian Zimmerman
*Assistant Examiner*—William Bangachon
(74) *Attorney, Agent, or Firm*—Winstead PC

(57) ABSTRACT

A radio frequency identification transponder including a power supply and a dynamic memory array which stores data. When power from the power supply ceases the data in the dynamic memory array is validly maintained for a predetermined period of time. The dynamic memory array is responsive to an interrogating signal for selectively updating the data. Further claimed is a radio frequency identification transponder wherein a signal processor extracts an identifier from the interrogation signal and is responsive to the identifier and the stored data to determine whether some or all of the identifier is stored in the dynamic memory array. Further claimed is a system wherein a transmitter provides a plurality of temporally spaced interrogating signals which are received by a receiver which incorporates a signal processor that is able to determine the order in which transponders were first in receipt of the interrogating signal. Further claimed is a baggage handling system wherein a transmitter provides a plurality of temporally spaced interrogating signals into an interrogating space through which a conveyor sequentially progresses baggage, a receiver receives transponder response signals which include baggage identity data, a signal processor then extracts the identity data and determines the order in which the baggage has progressed through the interrogating space.

15 Claims, 11 Drawing Sheets

U.S. PATENT DOCUMENTS

| | | | |
|---|---|---|---|
| 4,145,761 A | 3/1979 | Gunter et al. | |
| 4,303,904 A | 12/1981 | Chasek | |
| 4,399,821 A | 8/1983 | Bowers | |
| 4,441,125 A | 4/1984 | Parkinson | |
| 4,691,202 A | 9/1987 | Denne et al. | |
| 4,783,798 A | 11/1988 | Leibholz et al. | |
| 5,053,774 A | 10/1991 | Schuermann et al. | |
| 5,157,634 A | 10/1992 | Dhong et al. | |
| 5,258,762 A | 11/1993 | Cabon et al. | |
| 5,258,766 A | 11/1993 | Murdoch | |
| 5,300,875 A | 4/1994 | Tuttle | |
| 5,351,052 A | 9/1994 | D'Hont et al. | |
| 5,351,187 A | 9/1994 | Hassett | |
| 5,365,551 A | 11/1994 | Snodgrass et al. | |
| 5,392,251 A | 2/1995 | Manning | |
| 5,430,441 A | 7/1995 | Bickley et al. | |
| 5,479,172 A | 12/1995 | Smith et al. | |
| 5,539,394 A * | 7/1996 | Cato et al. | 340/10.32 |
| 5,583,819 A | 12/1996 | Roesner et al. | |
| 5,590,082 A | 12/1996 | Abe | |
| 5,608,739 A | 3/1997 | Snodgrass et al. | |
| 5,629,981 A | 5/1997 | Nerlikar | |
| 5,842,118 A | 11/1998 | Wood, Jr. | |
| 5,850,181 A | 12/1998 | Heinrich et al. | |
| 5,892,706 A | 4/1999 | Shimizu et al. | |
| 6,037,879 A | 3/2000 | Tuttle | |
| 6,046,676 A | 4/2000 | Ward et al. | |
| 6,097,622 A * | 8/2000 | Shimizu et al. | 365/145 |
| 6,404,325 B1 | 6/2002 | Heinrich et al. | |
| 6,462,647 B1 | 10/2002 | Roz et al. | |
| 6,538,564 B1 | 3/2003 | Cole et al. | |
| 6,597,620 B1 | 7/2003 | McMinn | |
| 6,603,400 B1 | 8/2003 | Shoobridge | |
| 6,856,581 B1 * | 2/2005 | Berstis et al. | 368/121 |
| 6,944,424 B2 | 9/2005 | Heinrich et al. | |
| 2003/0137400 A1 | 7/2003 | Heinrich et al. | |

FOREIGN PATENT DOCUMENTS

| | | |
|---|---|---|
| EP | 0467036 | 1/1992 |
| EP | 0585132 | 3/1994 |
| EP | 0 590 590 A | 4/1994 |
| EP | 0 590 590 B | 4/1994 |
| EP | 0702324 | 3/1996 |
| EP | 0 945 060 | 9/1999 |
| EP | 0942385 | 9/1999 |
| EP | 0 987 546 | 3/2000 |
| GB | 2259227 | 3/1993 |
| JP | 2004306541 | 11/2004 |
| WO | WO-9325918 | 12/1993 |
| WO | WO-9827441 | 6/1998 |
| WO | WO-9832092 | 7/1998 |
| WO | WO-9916015 | 4/1999 |
| WO | WO-99/30401 | 6/1999 |
| WO | WO-00/04480 | 1/2000 |
| WO | WO-00/10144 | 2/2000 |
| WO | WO-00/16289 | 3/2000 |
| WO | WO-00/23941 | 4/2000 |
| WO | WO-00/42569 | 7/2000 |
| WO | WO-00/43932 | 7/2000 |
| WO | WO-00/45331 | 8/2000 |
| WO | WO-00/74062 | 12/2000 |

* cited by examiner

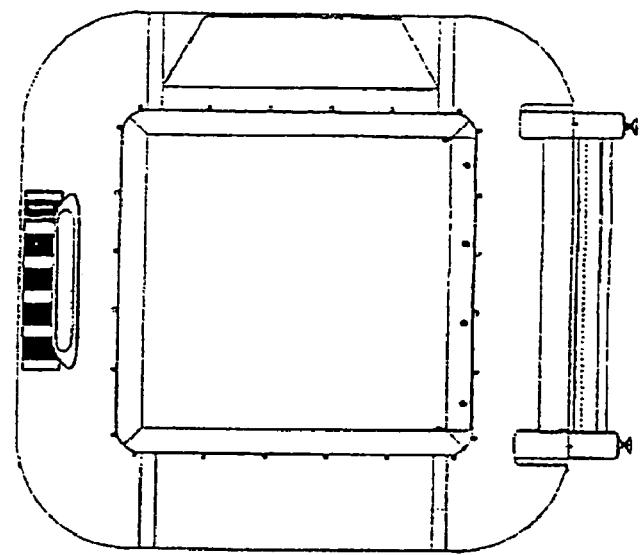
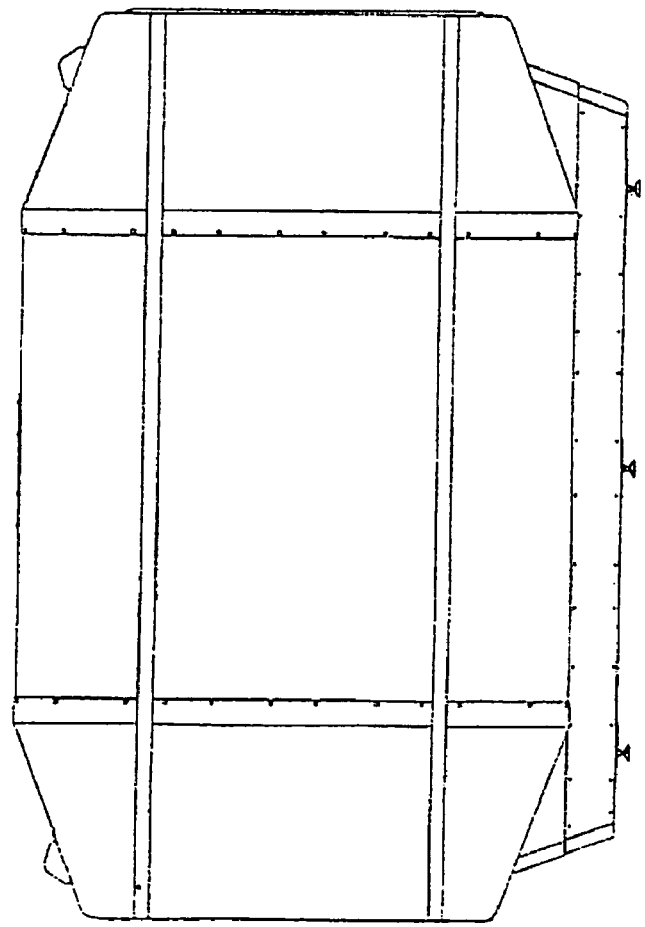
Figure 1
(Prior Art)

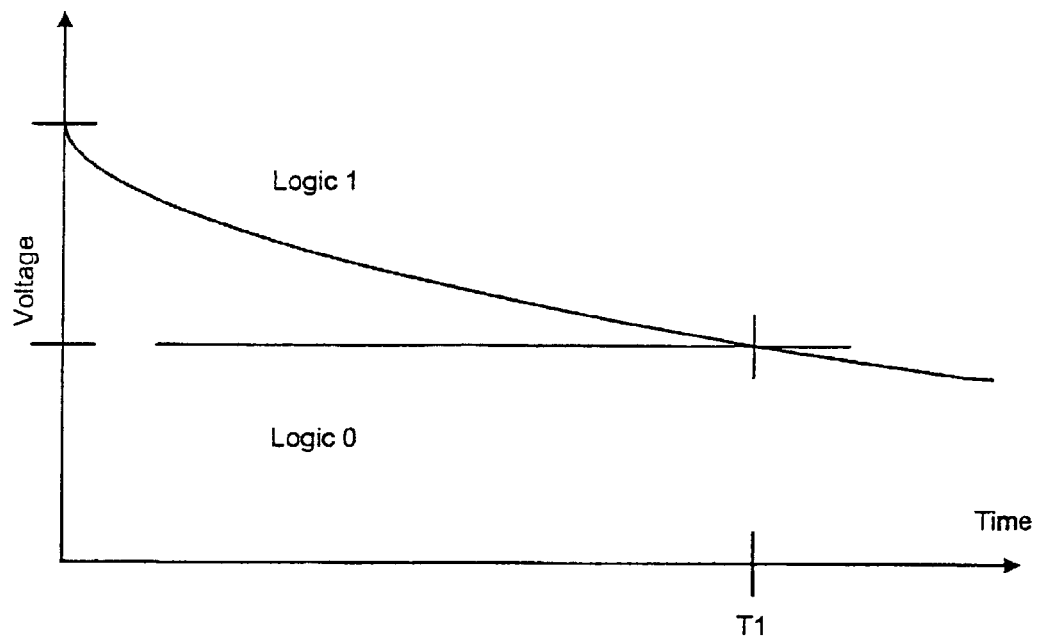
Figure 4(a): Discharge Waveform of Temporary Memory
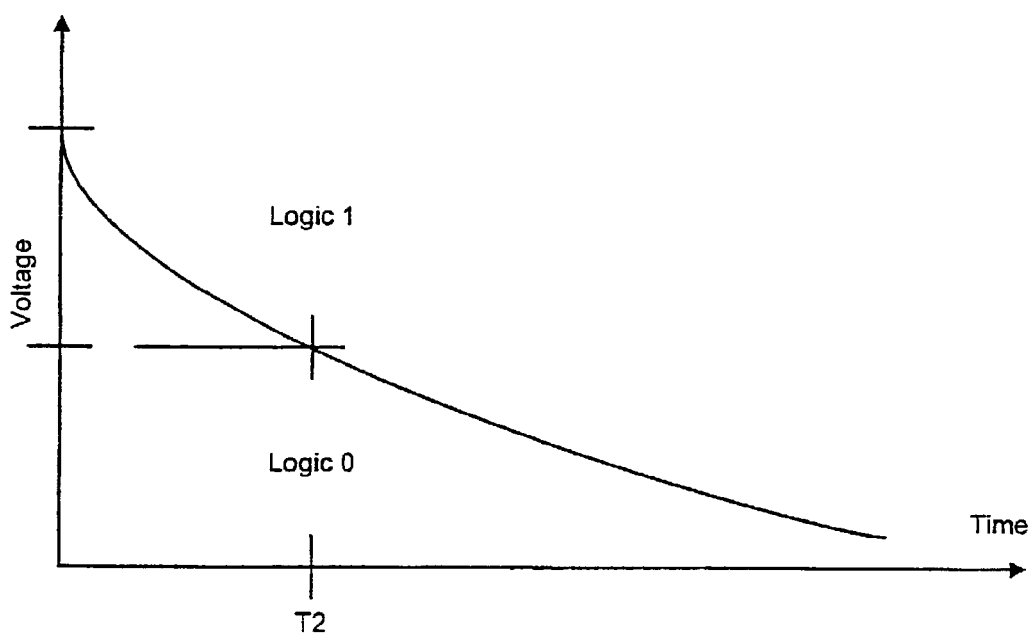
Figure 4(b) Discharge Waveform of Valid DRAM Bit

RADIO FREQUENCY IDENTIFICATION TRANSPONDER

FIELD OF INVENTION

The present invention relates to a radio frequency identification ("RFID") transponder, and more particularly to an RFID transponder that are used in orientation independent applications. That is, where a transponder must be operatable in random orientations.

The invention has been developed primarily for interrogating multiple passive transponders that are attached to objects to be identified by those respective transponders, and will be described hereinafter with reference to that application. A typical application is the identification of RFID transponders attached to conveyor fed-luggage where the transponder data is used to control the automatic sorting of the luggage. However, the invention is not limited to this particular field of use. For example, various aspects of the invention are applicable to systems based on active transponders, and to applications other than luggage sorting systems.

BACKGROUND

In prior art systems, transponders are read by interrogation fields within Tunnel Reader Programmers ("TRPs"). Typically, the orientation and position of transponders as they enter the TRP are random and unknown. Accordingly, the TRP must switch its interrogation fields between orthogonal directions so that the transponders can be interrogated independently of their orientation. U.S. Pat. No. 5,258,766 provides an example of such a system.

There are a number of specific issues arising from the practical use of RFID transponders, in, say, luggage handling situations. These issues include the facts that, for example:

1. A mechanical means, such as a conveyor, moves luggage (and thereby transponders) through the TRP.
2. Several transponders may be attached to a single item.

Where a mechanical means, such as a conveyor, moves items with attached transponders through the TRP the determination of the order of items on the conveyor is an essential requirement for allowing automated processing of the items. The determination of the order in which transponders enter a TRP is advantageous for determining the order of items on the conveyor. In prior art systems transponder order is normally inferred from the order in which they are identified. However, where multiple transponders are present the identification messages from these transponders may clash and the transponders may fail to be identified as they enter the TRP. When messages clash a further time interval will be required to correctly identify the transponders. During this time the transponders are moved further into the TRP by the conveyor. It is possible that subsequent transponder or transponders may enter the TRP before the first transponder is identified. It then becomes possible that one or more of the subsequent transponders may be identified before the first transponder. Consequently, the order of items may incorrectly be inferred from the order of transponder identification.

When the interrogation fields are switched, passive transponders power down within a relatively short time, at which point temporary data stored in volatile memory on board the transponder may be lost. Such data can include configuration information or temporary data stored in registers. In prior art systems configuration information or temporary settings required for transponder operation must be regenerated in the transponder after each switching of the interrogation field. This data can be read out of the transponder's memory or may have to be transmitted to the transponder by the TRP. This is undesirable because of the time delay involved. Moreover, in some cases, the data may no longer be available.

The above discussion is not to be taken as an admission of the extent of the common general knowledge in the field of the invention.

SUMMARY OF THE INVENTION

It is an object of the present invention to overcome, or at least substantially ameliorate, one or more of the disadvantages of the prior art or at least to provide a useful alternative.

According to a first aspect of the invention there is provided a radio-frequency identification ("RFID") transponder for use in an RFID system, the transponder including:

a dynamic memory array for storing first data; and a power supply for powering circuitry associated with the RFID transponder, including the dynamic memory array;

wherein the transponder is configured such that, when power ceases to be provided to the dynamic memory array by the power supply, the first data in the dynamic memory array is validly maintained therein for a predetermined time period; and wherein the memory is responsive to an interrogating signal from the system for selectively updating the first data.

Preferably, the RFID system provides an interrogating signal having an identifier and the transponder includes a receiver for receiving the signal. More preferably, the transponder includes a signal processor that is responsive to:

a) The receiver for extracting the identifier from the signal; and
b) The identifier and the first data for determining whether the identifier is stored in the memory array.

In a preferred embodiment, the power supply is configured to provide power by converting an externally applied electromagnetic excitation field into electrical power.

Preferably also, the first predetermined time period is determined by discharging of the dynamic memory array through stray leakage paths within the dynamic memory array.

Preferably, the RFID transponder further includes timer means for providing a validity flag in response to an interrogating signal, the flag being "valid" if the interrogating signal is received within a second time period and "invalid" if the interrogating signal is received after the second time period, the transponder being configured such that the data in the dynamic memory array is maintained in a readable state until at least the expiration of the second time period.

In a preferred form, the timer means includes a capacitive cell for storing a charge generated by current from the power supply, the timer means being configured such that, once power from the power supply ceases to be supplied, the charge in the capacitive cell discharges at a predetermined rate.

Preferably, the status of the validity flag is based on a voltage generated at a predetermined point in the timer means, the voltage decaying as the capacitive cell discharges. More preferably, the voltage is the output voltage of the capacitive cell as it discharges through a load.

In a preferred embodiment, the capacitive cell is a memory cell. It is particularly preferable that the memory cell form part of the dynamic memory array.

According to a second aspect of the invention there is provided an RFID system including a transponder according to the first aspect and a transponder interrogator for providing an interrogation field and reading data from the transponder.

Preferably, the interrogator is configured to sequentially switch an orientation of the interrogation field, and the second time period is selected to exceed the time that the interrogation field is off during switching of its orientation.

According to a third aspect of the invention there is provided a method of using a radio-frequency identification ("RFID") transponder in an RFID system, the method including the steps of:

storing first data in a dynamic memory array included within the transponder; and powering circuitry associated with the RFID transponder, including the dynamic memory array, with a power supply;

validly maintaining the data in the dynamic memory array for a predetermined time period after power ceases to be provided to the dynamic memory array by the power supply; and being responsive to an interrogating signal from the system for selectively updating the first data.

Preferably, the method includes the additional step of the RFID system providing an interrogating signal having an identifier, and the transponder includes a receiver for receiving the signal. More preferably, the transponder includes a signal processor that is responsive to:

a) The receiver for extracting the identifier from the signal; and b) The identifier and the first data for determining whether the identifier is stored in the memory array.

According to a fourth aspect of the invention there is provided a radio-frequency identification ("RFID") transponder for use with an RFID interrogator that provides a plurality of temporally spaced interrogating signals, wherein the signals include respective identifiers and the transponder includes:

a receiver for receiving the interrogating signals from the interrogator;

a memory array for storing first data; and a signal processor being responsive to the receiver for extracting the identifier from the signal and being responsive to the identifier and the first data for determining whether some or all of the identifier is stored in the memory array.

If some or all of the identifier is stored in the memory array, it is preferred that the data stored updates some or all of the first data.

Preferably, the signal processor determines that the identifier is stored in the memory array if the identifier is different to the first data. In other embodiments the signal processor determines that the identifier is stored in the memory array if a predetermined portion of the identifier is different to the first data.

Preferably also, the identifier includes data that is selected from one or more of the following types:

second data indicative of the interrogator; and third data that is not constant for the respective signals.

More preferably, the third data is indicative of the timing of the respective signal. However, in other embodiments, the third data is a pseudo random number or character string. More preferably, the second data includes a reference number for the interrogator that is the same for all the signals provided by the interrogator. Even more preferably, the third data includes a date stamp that varies with the passage of time. That is, while the reference number will remain constant, the date stamp changes with time to allow greater functionality, as will become apparent from the following detailed description.

Preferably, the signal processor determines that the third data is stored in the memory array if the third data is different from the first data. More preferably, the signal processor determines that the third data is stored in the memory array if the second data is different from the first data. That is, in the latter case, the memory array stores information—the third data—if it is the first time that the interrogator has interrogated the transponder. In some embodiments the second data is stored in the memory whenever the third data is stored in the memory array. In other embodiments additional information is derived from the interrogation signal and selectively stored in the memory array.

Preferably, the signal processor determines that the second data is stored in the memory array if the second data is different to the first data. That is, the memory array stores information—the second data—if it is the first time that the interrogator has interrogated the transponder.

It will be understood that by "interrogated" it is meant that the interrogation signal is received by the transponder.

In other embodiments the signal processor determines that the identifier is stored in the memory array if the third data is sufficiently different to some or all of the first data. More particularly, in embodiments where the third data includes a date stamp that is indicative of the time of the respective signal, it is preferred that that date stamp is compared with the first data to determine whether sufficient time has elapsed since the last store of the third data in the memory array. If the elapsed time is large, then the more recent third data is stored in the memory array.

In a preferred form, the transponder includes a transmitter for transmitting a reply signal to the interrogator in response to an interrogating signal, wherein the reply signal includes:

fourth data indicative of the transponder; and fifth data derived from the first data.

Preferably also, the fifth data includes either or both of the second data or the third data. More preferably, the fifth data includes the third data. In some embodiments, all of the respective identifier is stored in the memory array to constitute the first data. A subset of these embodiments will include within the reply signal all the information contained in the first data. Other embodiments will include less than all of the information contained within the first data.

The fourth data is preferably a coded string for allowing discrimination between other transponders used with the interrogator.

According to a fifth aspect of the invention there is provided a method of using a radio-frequency identification ("RFID") transponder with an RFID interrogator that provides a plurality of temporally spaced interrogating signals, wherein the signals include respective identifiers and the method includes the steps of:

receiving the interrogating signals from the interrogator with a receiver;

storing first data in a memory array; and being responsive to the receiver for extracting the identifier from the signal and being responsive to the identifier and the first data for determining whether some or all of the identifier is stored in the memory array.

According to a sixth aspect of the invention there is provided a radio-frequency identification ("RFID") interrogator for interrogating a plurality of RFID transponders, the interrogator including:

a transmitter for providing a plurality of temporally spaced interrogating signals, wherein the signals include respective identifiers;

a receiver for receiving response signals from the respective transponders, the response signals including respective identity data that is derived from one or more of the interrogator signals; and a signal processor being responsive to the receiver for extracting the identity data from the response signals to determine the order in which the transponders were first in receipt of an interrogating signal.

Preferably, the interrogator is a TRP and the transponders are attached to respective articles that are being progressed through the TRP, wherein the signal processor is responsive to the determination of the order in which the transponders were first in receipt of an interrogating signal for determining the order in which the articles progress through the TRP. More preferably, the articles are aircraft luggage such as suit cases, baggage, boxes or the like.

According to a seventh aspect of the invention there is provided a method of interrogating a plurality of radio-frequency identification ("RFID") transponders with an RFID interrogator, the method including the steps of:

providing a plurality of temporally spaced interrogating signals to the transponders, wherein the signals include respective identifiers;

receiving response signals from the respective transponders with a receiver, the response signals including respective identity data that is derived from one or more of the interrogator signals; and being responsive to the receiver for extracting the identity data from the response signals to determine the order in which the transponders were first in receipt of an interrogating signal.

According to an eighth aspect of the invention there is provided a plurality of radio-frequency identification ("RFID") transponders for use with an RFID interrogator that provides a plurality of temporally spaced interrogating signals that include respective identifiers, the transponders each including:

a receiver for receiving one or more of the interrogating signals;

a signal processor being responsive to the receiver for extracting the identifiers from the one or more signals; and a transmitter being responsive to the identifiers for transmitting a response signal for allowing the interrogator to determine the order in which the transponders were first in receipt of an interrogating signal.

Preferably, the identifier includes first data indicative of the time of the provision of the interrogating signal and the response signal includes data derived from the identifier and data unique to the respective transponder. More preferably, the identifier also includes second data unique to the interrogator and the response signal is derived from the first and the second data.

Preferably also, the transponders each include respective memory arrays for storing selected data. More preferably, each transponder includes a power supply for supplying power to the transponder, inclusive of the memory array. Even more preferably, each memory array validly maintains the selected data for a predetermined time period after power ceases to be provided to the power supply.

In a preferred form, the memory array is comprised of dynamic memory. More preferably, the memory array is comprised of DRAM. In other embodiments, however, use is made of RAM.

According to a ninth aspect of the invention there is provided a method of using a plurality of radio-frequency identification ("RFID") transponders with an RFID interrogator that provides a plurality of temporally spaced interrogating signals that include respective identifiers, the method including the steps of:

the transponders receiving one or more of the interrogating signals with respective receivers;

being responsive to the respective receivers for extracting the identifiers from the one or more signals; and transmitting respective response signals in response to the identifiers for allowing the interrogator to determine the order in which the transponders were first in receipt of an interrogating signal.

According to a tenth aspect of the invention there is provided a baggage handling system for baggage that is tagged with respective radio-frequency identification ("RFID") transponders, the system including:

an RFID interrogator that transmits a plurality of temporally spaced interrogating signals into an interrogating space, wherein the signals include respective identifiers;

a conveyer for sequentially progressing the baggage through the interrogating space;

a receiver for receiving response signals from the transponders, wherein the response signals include identity data that is derived from one or more of the interrogator signals; and a signal processor being responsive to the receiver for extracting the identity data from the response signals and thereby determining the order in which the baggage is progressed through the interrogating space.

In some embodiments the system includes a plurality of spaced apart interrogators and the identifiers include data indicative of the interrogator that transmitted the respective interrogating signal.

According to an eleventh aspect of the invention there is provided a method of handling baggage that is tagged with respective radio-frequency identification ("RFID") transponders, the method including the steps of:

transmitting a plurality of temporally spaced interrogating signals into an interrogating space with an RFID interrogator, wherein the signals include respective identifiers;

sequentially progressing the baggage through the interrogating space;

receiving response signals from the transponders with a receiver, wherein the response signals include identity data that is derived from one or more of the interrogator signals; and being responsive to the receiver for extracting the identity data from the response signals and thereby determining the order in which the baggage is progressed through the interrogating space.

Preferably, once a transponder has been "interrogated" and has responded to that interrogation, it is muted, in that it will not respond to subsequent interrogation signals. Preferably also, the mute is only in respect of interrogation signals from the same interrogator. That is, if the transponder receives an interrogation signal from another interrogator it will respond. In still further embodiments the first interrogated is configured to selectively "un-mute" the interrogated transponder by providing in identifier that indicates to the transponder that it is another interrogator.

BRIEF DESCRIPTION OF THE DRAWINGS

Preferred embodiments of the invention will now be described, by way of example only, with reference to the accompanying drawings, in which:

FIG. 1 shows a prior art TRP;

FIGS. 4(a) and 4(b) show waveforms associated with the exemplary circuit schematics shown in FIGS. 3(a) and 3(b);

DETAILED DESCRIPTION

FIG. 1 shows a TRP for a prior art transponder system as disclosed by U.S. Pat. No. 5,258,766.

Figure 7:
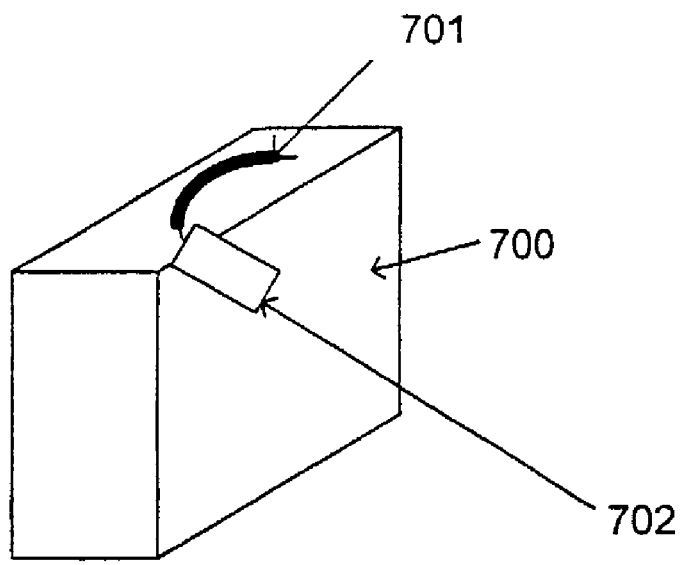
FIG. 7 is a perspective view of a piece of luggage having attached to it a transponder according to the invention.

Referring now to FIG. 7, there is illustrated a piece of luggage 700 which includes a handle 701 that supports a radio frequency identification ("RFID") transponder 702. In this case, transponder 702 is a passive transponder intended to be powered by an interrogation signal as discussed below. However, it will be appreciated that the transponder could be active (battery powered) or a hybrid active/passive transponder. It will also be understood that the use of RFID transponders on luggage is only one example of a wide range of uses to which the technology can be applied.

Figure 9:
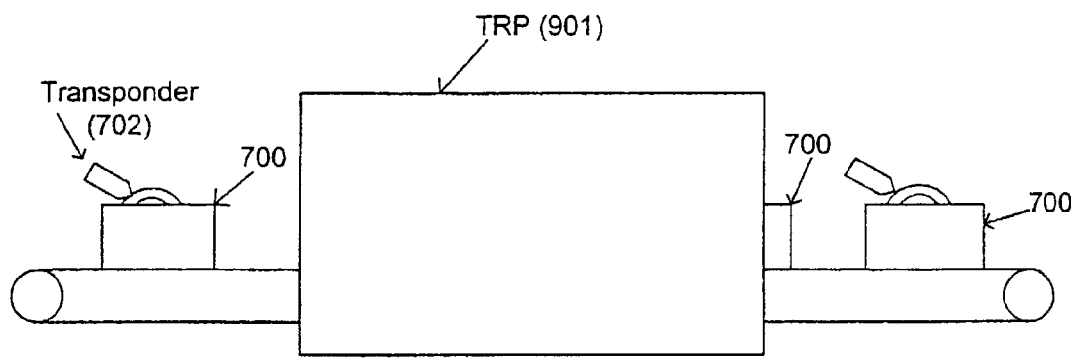
FIG. 9 shows a diagram of a conveyor mounted interrogator according to the invention with closely spaced items with transponders attached to the items.

FIG. 9 shows a diagram of a conveyor mounted TRP 901 with a series of closely spaced luggage items 700 on the conveyor such as would be encountered on a baggage handling system in an airport, a train station or other transport interchange. Each item has one or more RFID transponder 702 attached. Each transponder includes a unique character string that is transmits, upon interrogation, to allow identification of the specific transponder.

To allow automated sorting and to facilitate other physical handling processes involving the items it is necessary to carefully and accurately determine the order of the items on the conveyor. This, in turn is greatly facilitated if an accurate determination of the order in which the transponders enter a TRP can be made.

It has been known to infer the item order on the conveyor from the order in which the respective transponders are identified by an interrogator. However, with the increasing volumes of items to be handled and the short time in which to affect that handling, there is constant pressure to increase conveyor speeds and to reduce the spacing between the items. Moreover, the number of possible combinations of arrivals and departures from major terminals is escalating which in turn introduces more complexity and more need for increased processing of the items. The result of which is to use multiple transponders. However, with prior art devices this only exponentially increases the risk that the identification messages from these transponders will clash and the transponders will fail to be identified as they enter the TRP. This failing of the prior art only compounds the problem, because when messages clash a further time interval is required to correctly identify the transponders. During this further interval the transponders are moved further into the TRP by the conveyor. This then gives rise to the risk of subsequent transponders entering the TRP before the first transponders are identified. It then becomes possible that one or more of the subsequent transponders will be identified before the first transponder. Consequently, with rising conveyor speeds and decreasing distances between items, the order of the items cannot be reliably inferred from the order of transponder identification.

As discussed earlier, in the TRP of the present preferred embodiment, the interrogation field is sequentially and periodically switched between orthogonal orientations to ensure that all transponders are powered regardless of their relative orientations. In one preferred embodiment of the present invention, when the interrogation field is first transmitted in an orthogonal orientation, a unique number is transmitted by the TRP as part of the interrogating signal. This number is representative of the time of the transmission and the particular orthogonal orientation. This number, defined as a time stamp number, is received by all transponders that are being powered by the interrogation field. Those tags that are being powered for the first time store the time stamp number in a memory. Those tags that already have a time stamp number stored in memory from an earlier interrogation ignore the new time stamp number.

It will be appreciated that the direction of the interrogating field is switched about every 10 ms although in other embodiments different periods are used. Moreover, while the preferred embodiment generates a new time stamp at each switching, it is known in other embodiments to use the same time stamp for respective direction for a plurality of cycles, and in some cases up to ten cycles. This, however, is dependent upon the speed of the conveyor, the density of the items on the conveyor and the length of the TRP.

Returning to the preferred embodiment, each transponder has an on-board memory array for storing first data and a signal processor for extracting the time stamp from the interrogating signal. The contents of the memory array—the first data—is compared with the extracted time stamp and, under certain conditions, the time stamp is stored in the memory array. More preferably, if the time stamp is stored, it overwrites some or all of the first data to constitute fresh first data.

That is, the transponders are configured to access the respective time stamps and to selectively store the information in their memory arrays. The decision as to whether the first data is over written is dependent upon whether or not that transponder has previously been interrogated by the interrogator. If not, then the first data is overwritten. Conversely, if so, then no overwrite occurs. In effect, the first data is representative of the earliest instant the transponder entered the TRP and was powered—that is, interrogated—for the first time by that interrogator.

The time stamp number is then included as part of each transponders reply or response message. When the transponders provide this message it is received by the interrogator to allow the transponders, and the corresponding items, to be identified and the order of entrance into the TRP to be determined from the time stamp number. The determination of transponder order is now independent of the rate of identification. The operation of the preferred embodiment allows a transponder to traverse the full length of the TRP before it need be identified and the presence of many transponders inside the TRP is not problematic, as all are identified without loss of transponder order.

Advantageously, the preferred embodiment allows the velocity with which transponders move through the TRP to be much higher than the prior art systems where transponders must be identified before the next transponder enters the TRP.

The apparatus and method of the preferred embodiment is not limited to TRP operation but rather is applicable to any single or multiple axis transponder reader. That is, all these devices are suitable for periodically transmitting a unique time stamp number so that transponders newly entered into the interrogation field receives and stores the time stamp. Subsequently the time stamp is included in the transponder's reply message and the reader is able to infer the earliest instant that the transponder entered the interrogation field.

It will be appreciated that the response or reply signal that is provided by the transponder includes information in addition to any data that is derived from the identifier. This information is usually a unique code or string that allows the transponder itself to be identified. That is, the response signal, once decoded by the interrogator, obtains not only data indicative of the particular transponder, but also feedback as to the timing or order in which that transponder was first interrogated.

Figure 12:
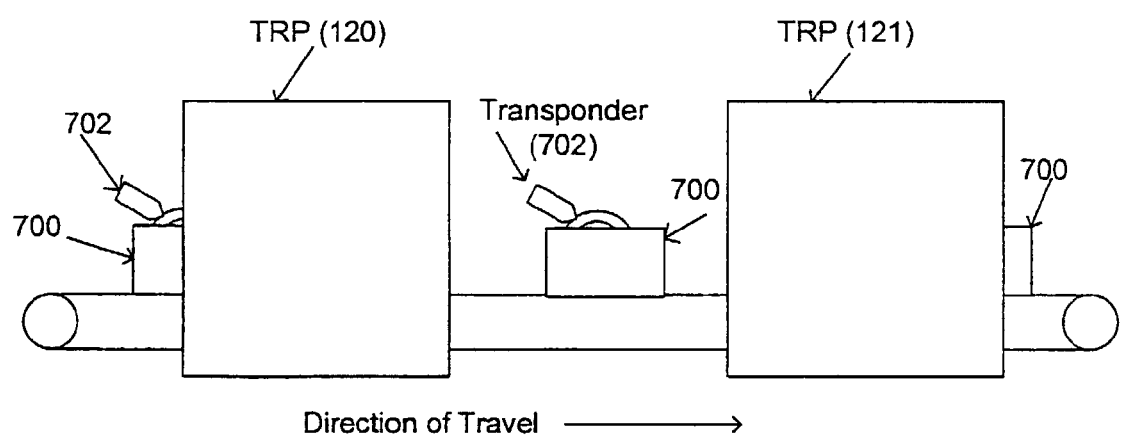
FIG. 12 shows a diagram of a baggage handling system according to the invention including two closely spaced conveyor mounted interrogators.

Preferably, the interrogating signal includes an identifier that includes, in addition to the time stamp referred to above, a unique character string or other unique code for allowing identification of the interrogator. This becomes particularly significant in systems where use is made of a plurality of interrogators. For example, in FIG. 12 there is illustrated a system where two TRP's—TRP 120 and TRP 121—are closely spaced on a conveyor. The items and the corresponding transponders exit TRP 120 and enter the next TRP 121 in quick succession. Using conventional systems with high conveyor speeds it is increasingly common for the time interval between exit and entrance to be too short for the transponder circuits to detect that the TRP has changed. Under these conditions there is an increasing risk that the transponder will ignore the time stamp number transmitted by the second TRP. However, the application of the invention to this system overcomes those limitations of the prior art as the transponder will respond to the interrogation signal from the second interrogator as it will provide an identifier that is different to that of the first interrogator. More particularly, when the interrogation field is first actuated in a fresh orthogonal direction a unique number representative of the TRP is transmitted by the TRP. This number, called the TRP identification number (TRP ID), is received by all transponders that are being powered by the interrogation field. Those tags that are being powered for the first time store the TRP ID in memory. Those tags that already have a TRP ID stored in memory from an earlier interrogation compare this stored TRP ID against the transmitted TRP ID to determine whether the transponder has entered a new TRP. If the TRP ID's are different the transponder stores the new number to memory and proceeds to operate as though they were being powered for the first time. In this manner the close spacing of TRP does not impair transponder operation.

Figure 2:
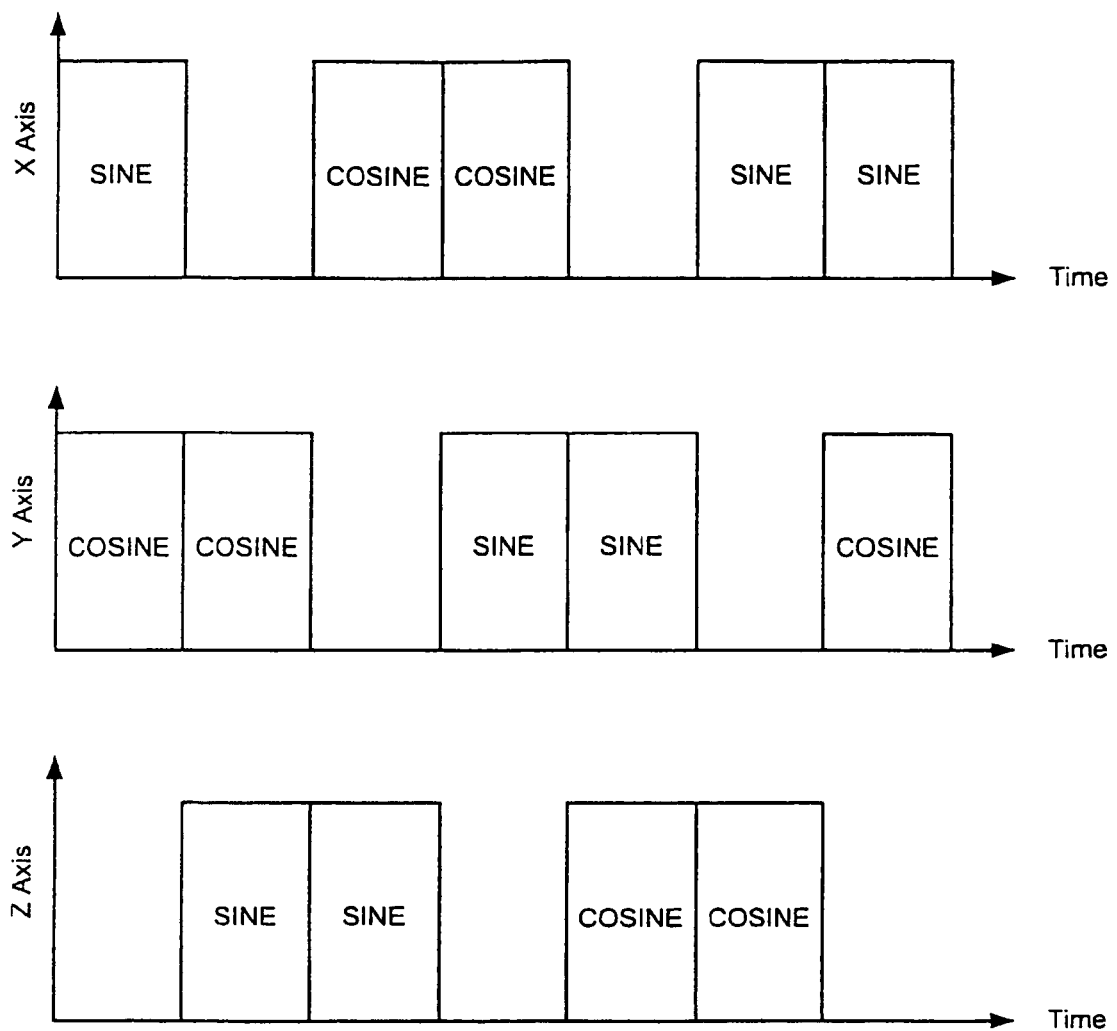
FIG. 2 shows waveforms associated with the prior art TRP of FIG. 1.

FIG. 2 shows the interrogation waveforms associated with the prior art TRP shown in FIG. 1. The TRP uses three orthogonal axes along the X, Y and Z directions. It excites these with sine or cosine currents as described in U.S. Pat. No. 5,258,766.

Figure 10:
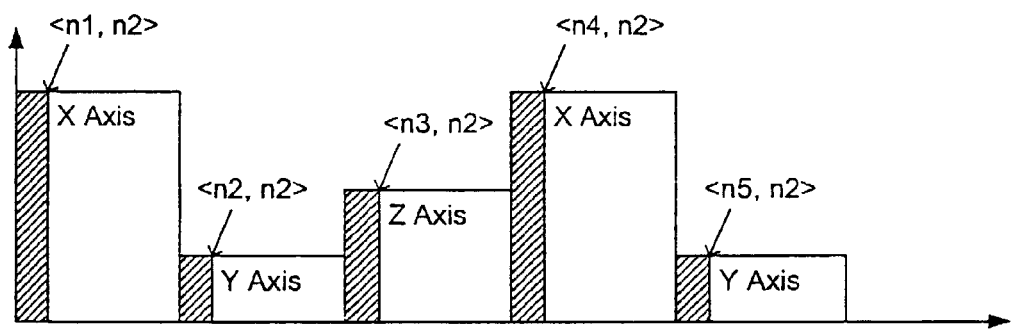
FIG. 10 shows waveforms received by a transponder according to an embodiment of the invention.

In contrast, FIG. 10 shows the interrogation waveform received by a transponder according to a preferred embodiment of the invention where the time stamp number and TRP ID <number1, number2> are transmitted at the beginning of each orthogonal field. A transponder oriented along one of the orthogonal axes will periodically experience a power outage when the excitation is removed from that axis. Passive transponders power down within a relatively short time, at which point data stored in volatile memory on board the transponder will be lost if the power down time is sufficiently long. Such data can include the time stamp number, TRP identification number, configuration information or temporary data stored in registers.

If the configuration information or temporary settings required for transponder operation are lost then they must be regenerated in the transponder after each switching of the interrogation field. This data can be read out of the transponder's memory or may have to be transmitted to the transponder by the TRP. This is undesirable because of the time delay involved. Moreover, information such as the time stamp will be no longer available.

To prevent the loss of the transponder's time stamp number, TRP ID, configuration information or other temporary data, the data must be stored in either conventional dynamic memory that is able to hold its information for a period longer than the longest periodic power outage. This memory array will be referred to as "temporary memory". EEPROM has the disadvantage that writing data into memory takes several milliseconds. A Random Access Memory RAM or a Dynamic Random Access Memory DRAM like memory does not suffer from slow write times and consumes little power. It will be appreciated that RAM will hold its data provided the supply voltage is maintained and DRAM will hold its data for a short time after the supply voltage has been removed.

Figure 13:
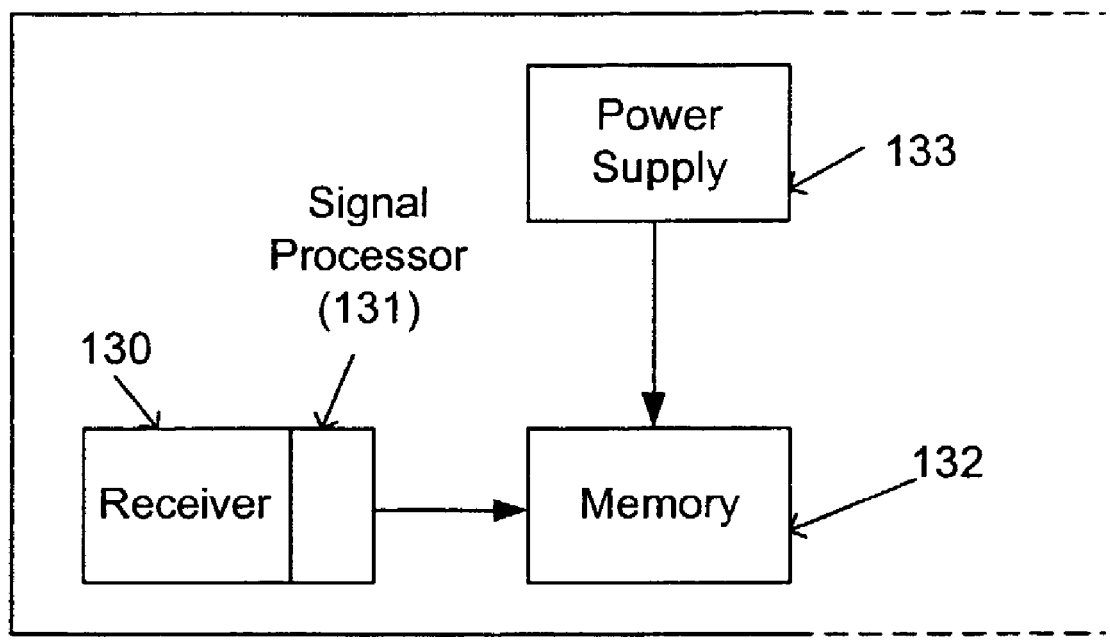
FIG. 13 shows a block diagram of relevant functional portions of a transponder according to another embodiment of the invention.

FIG. 13 shows a simplified block diagram of specific portions of the RFID transponder's circuits pertinent to the invention. It will be understood by those skilled in the art that RFID tags include a number of functional blocks other than those illustrated. However, these have been omitted from the present description for the purposes of clarity, on the basis that those skilled in the field will be aware of the blocks required, and how to implement them in an RFID tag. The receiver 130 receives the interrogator's interrogating signal which, in this embodiment, includes an identifier in the form of the time stamp number and the TRP ID. In other embodiments only one or the other of the time stamp and TRP ID are sent. Moreover, in still further embodiment additional information is included instead of or in addition to the above information.

The transponder includes a signal processor 131 that is responsive to the receiver 130 for extracting the identifier which is supplied in whole or in part to the on-board memory 132 for storage. The decision as to what information to store, if any, is usually based upon a comparison of the identifier with the existing contents of the memory. For example, in some instances it will simply be a decision of whether the identifier is different from the stored information, as this will be the case upon the first interrogation of the transponder as it is usual for the memory 132 to contain all zeros or all ones at the time of power up. Accordingly, the decision, in some embodiments, is based upon whether the stored date stamp has, in effect, timed out. In other embodiments, however, the decision is based upon a comparison of the received and the stored TRP ID. That is, if the TRP ID is different then the transponder overwrites the stored data with the freshly received data in recognition that the transponder is now being interrogated by another TRP. In further embodiments alternative decision making processes are involved. However, the end result of this is that the memory 132 will contain at least one identifier or at least a sufficient portion of that identifier to allow the transponder to communicate timing details to a TRP when interrogated.

The transponder also includes an on-board power supply 133 for providing electrical power to the transponder. It will be appreciated that the power supply also supplies power to the memory 132.

Figure 8:
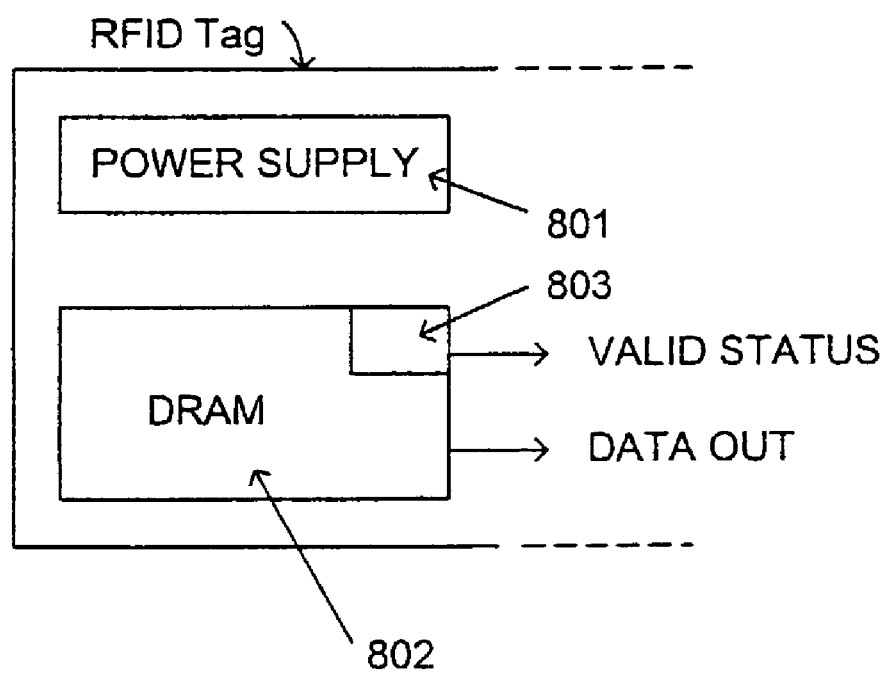
FIG. 8 is a block diagram of relevant functional portions of the transponder according to the invention.

Turning to FIG. 8, there is shown a simplified block diagram of specific portions of an embodiment of the invention that makes use of temporary memory. In particular, an RFID tag 800 is illustrated and includes a substrate for supporting all the electronic components, some of which are shown and others of which are omitted for the sake of clarity. The components of interest are a power supply 801 and a temporary memory array in the form of dynamic random access memory (DRAM) 802. The DRAM 802 includes a plurality of address cells (described in detail in relation to FIGS. 3(a) and 5) for holding temporary data used by the RFID transponder and its interrogator. In the preferred embodiment, the DRAM also includes timing means in the form of a modified memory cell 803 and associated circuitry (discussed in detail in relation to FIGS. 3(b) and 6). Alternative embodiments of the circuit shown in FIG. 8 will be discussed later.

Figure 3A:
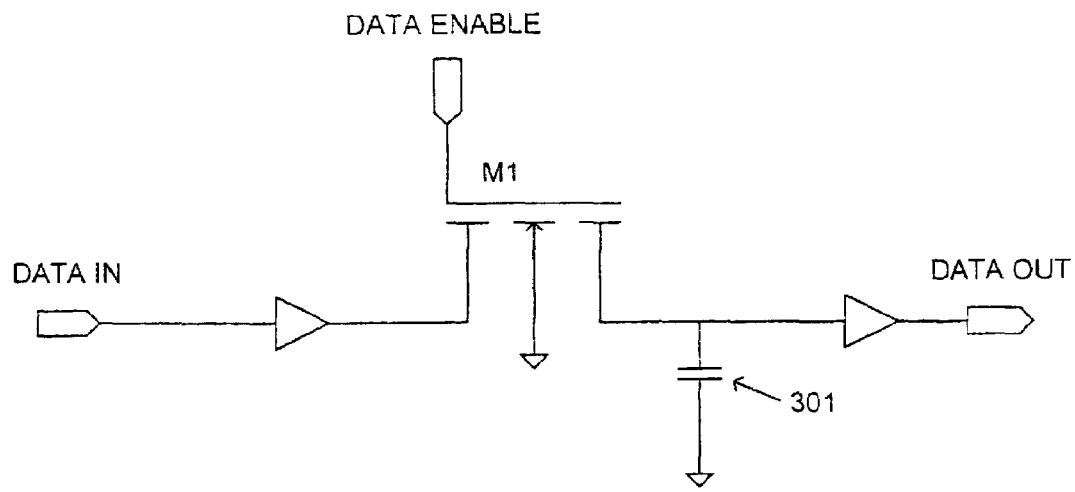
FIGS. 3(a) and 3(b) show exemplary circuit schematics associated with a transponder memory array according to the present invention.

FIG. 3(a) shows a schematic of a preferred circuit used for storing one bit of temporary data. It will be appreciated that the memory on-board the transponder is comprised or many like circuits to provide the storage capacity required for the application concerned. Referring back to FIG. 3(a), the memory circuit is a temporary memory circuit where data is input at Data In, input data is stored on the storage capacitor by Data Enable and the stored data is available at Data Out. Data is stored on a storage capacitor 301, and once so stored, there is no discharge path other than leakage currents through M1 and the output inverter's gate capacitances. These leakage currents are relatively small and the storage capacitor voltage will maintain itself for at least a few seconds. The normal refresh circuits used for maintaining the data once stored are not shown but are well known and understood to those in the relevant field.

The data that is stored in the temporary memory will typically be derived from one of two sources. Firstly it can be derived from the TRP which transmits the data to the transponder. Secondly it can be derived internally; either from the transponder's own memory or generated from circuits on the transponder.

Figure 3B:
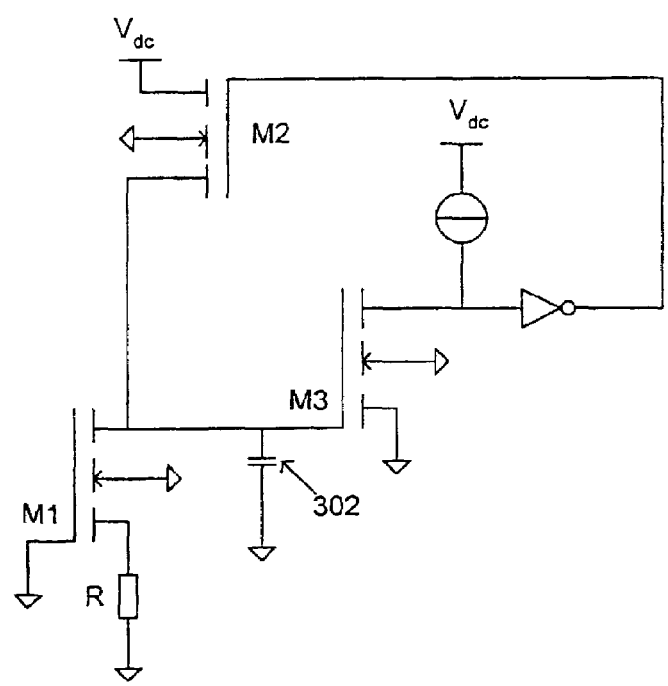

FIG. 3(b) shows a schematic of a preferred the circuit used for storing the Valid DRAM Bit. The chip voltage Vdc is maintained on a storage capacitor 302 by the refresh circuit formed by M2, M3, a current source and an inverter. When the voltage Vdc decreases due to a power outage the refresh circuit prevents the storage capacitor from discharging through M2. Discharge occurs through the current sink formed by M1 and R. This circuit, when M1 is correctly sized, provides a reliable and stable discharge current. The details of this circuit's operation are provided in the publication "Switched-Source-Impedance CMOS Circuit For Low Standby Subthreshold Current Giga-Scale LSI's" pages 1131–1135 of the IEEE JOURNAL OF SOLID STATE CIRCUITS. VOL 28 NO 11, NOVEMBER 1993. The discharge current will always be larger than the leakage currents in the circuit of FIG. 3(a). Accordingly, the circuit shown in 3(b) will always discharge before the temporary memory circuit and may therefore be used to indicate the validity of the temporary memory.

FIG. 4(a) shows a representation of the discharge waveform for the temporary memory circuit. FIG. 4(b) shows a representation of the discharge waveform for the Valid DRAM Bit circuit. It will be noted that the Valid DRAM Bit discharge to the transition point between a logical one and zero is significantly shorter than the temporary memory circuit because of the discharge circuit M1 and R.

Figure 5:
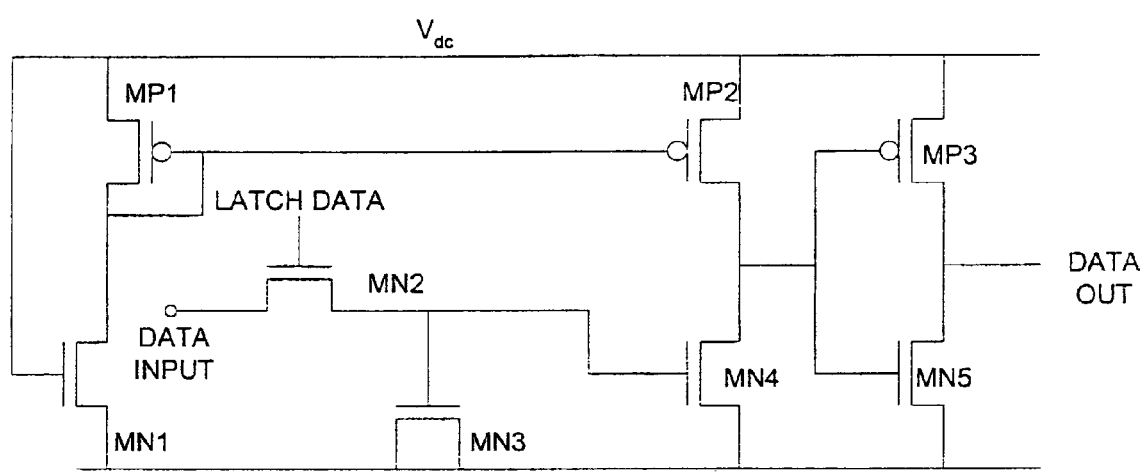
FIG. 5 shows an example circuit for use with a transponder memory array according to the invention.
Figure 6:
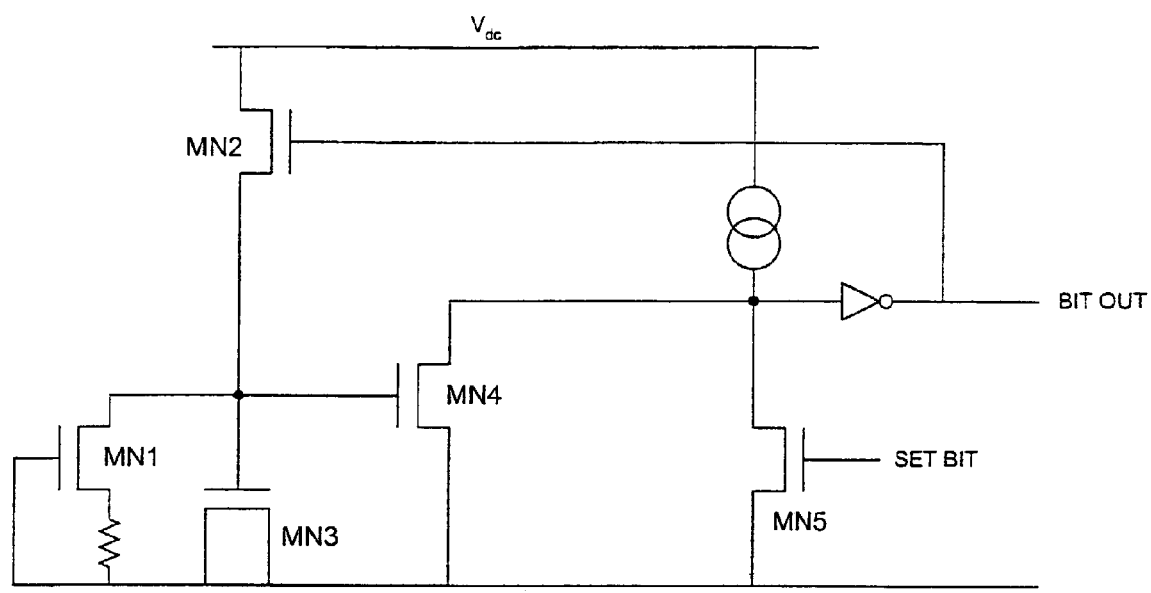
FIG. 6 shows an example circuit for use with a transponder memory array according to the invention.
Figure 11:
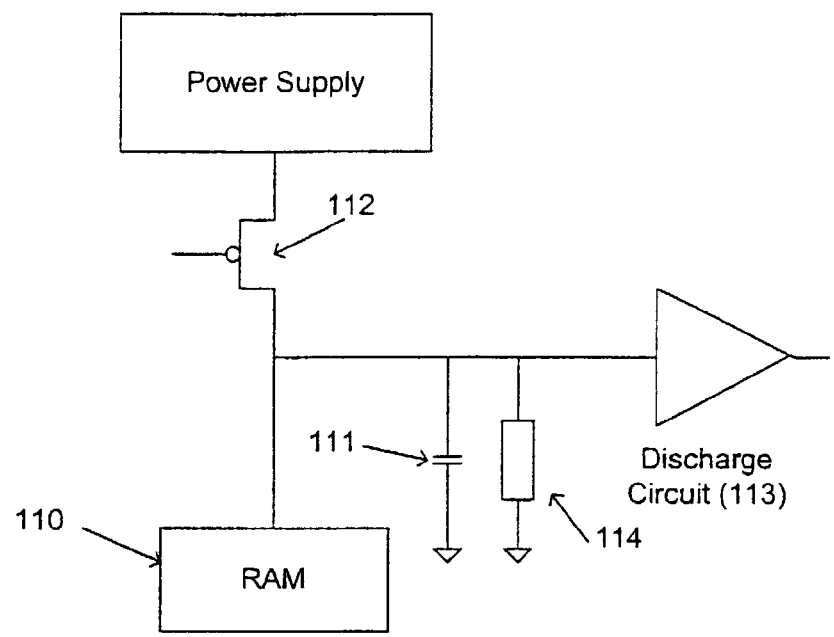
FIG. 11 shows an embodiment of the invention having a memory array using RAM.

FIG. 5 shows a circuit for temporary memory fabricated on a silicon chip, whilst FIG. 6 shows a circuit for a Valid DRAM Bit fabricated on a silicon chip FIG. 11 shows an alternative embodiment of the invention where use is made of temporary memory using RAM, where the electrical power for the memory 110 is stored on a storage capacitor 111. During a power outage the storage capacitor 111 is isolated from the main power supply by the series pass transistor 112. A discharge circuit 113 and voltage level detector 114 connected in parallel with the storage capacitor 111 is used to limit the maximum time that data remains stored in the memory. The discharge current is small enough to ensure that the memory contents remain valid during normal power outages. If the transponder remains without power for too long then the storage capacitor will discharge below the voltage threshold of the level detector. When power is reapplied the chip circuits will detect that the storage capacitor has discharged and recognise that the contents of the RAM are invalid.

Figure 14:
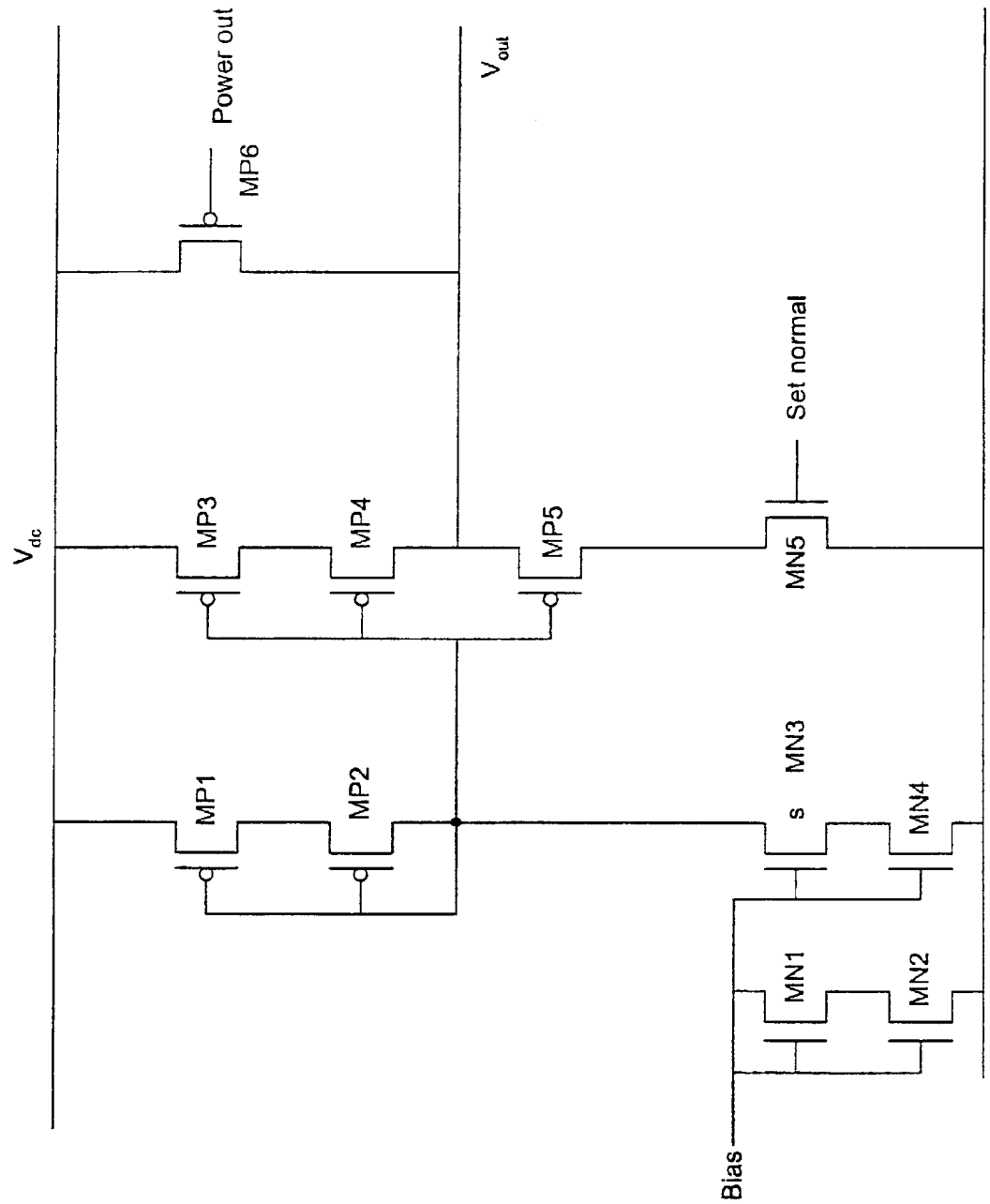
FIG. 14 shows an example circuit of a memory power supply isolator for use with a transponder according to the invention.

FIG. 14 shows a RAM power supply isolation circuit fabricated on a silicon chip for an embodiment of the invention. This provides one specific example of the implementation of such circuitry and is intended to be indicative of the layout. It will be appreciated by those skilled in the art that other configurations and layouts are also suitable.

The methods used by the invention are applicable to a number of other aspects in a transponder system to provide advances over the prior art. Some of these aspects are further described below under that following headings.

Mute Chip Bit

Where many transponders are simultaneously present inside a TRP the number of transponder identification messages may interfere with the identification process. It is advantageous to be able to silence transponder transmissions once the TRP has identified the transponder and completed all necessary dialogue with the transponder. The TRP may transmit a command, which mutes the transponder preventing further transmissions by the transponder. In the prior art systems the sequential and periodic switching of the interrogation field by the TRP results in transponders periodically powering down.

Unfortunately, when they power down they lose this mute information. This necessitates that the muting information be repetitively transmitted for each new orthogonal direction. This reduces the time available for the TRP to receive transponder-identifying messages.

In yet another preferred embodiment of the invention the muting information is stored in the temporary memory, in the form of a "Mute Chip Bit". It is particularly advantageous to store this bit in temporary memory because the bit is not lost as the interrogation field is sequentially and periodically switched between the orthogonal directions. When a transponder powers up it can inspect the Mute Chip Bit and determine whether it should be mute.

Configuration Settings

There are a number of transponder functional settings that provide enhanced system performance if they are chosen correctly. These settings can be advantageously stored in transponder temporary memory where they will be unaffected by the periodic power outages caused by the sequential switching of the interrogation field. Some examples of these are provided below to show the utility of using temporary memory.

PRBS Number:

Transponders may use a random number for controlling some functions. For example transponders may uses a random time delay between reply transmissions where a random number controls the length of the delay. Alternatively transponders may randomly select a frequency for transmitting a reply where a random number controls the frequency selected. An example of such a system is U.S. Pat. No. 5,302,954. Random numbers are conveniently generated on chips by Pseudo Random Binary Sequence PRBS generators. These are made using long shift registers with feedback at critical points. For correct operation the binary number in the shift register must not be lost during the power outages caused by the sequential switching of the interrogation field. This is achieved if the shift register contents are stored in temporary memory, using a preferred embodiment of the present invention.

Chopper Settings:

For applications where there are a large number of transponders present, the number of transponder identification messages may choke the communication system. Under these circumstances the proportion of transponders transmitting must be reduced. One method of achieving this is to introduce a random time delay between reply transmissions where a random number controls the length of the delay and the average length of the delay is set by the TRP. In this manner only a small portion of transponders are transmitting at any one time. The larger the average delay the smaller the proportion of transponders transmitting. The TRP can set the average delay length by writing to control bits. These bits represent the "Chopper Setting". It is advantageous if the Chopper Setting is not lost during the periodic power outages caused by the sequential switching of the interrogation field. This is achieved if the Chopper Setting is stored in temporary memory, using a preferred embodiment of the present invention.

Power Mode Control:

For applications where there are a large number of transponders present and in close proximity, coupling between proximate operating transponders may impair transponder operation. Under these circumstances the proportion of transponders operating must be reduced so that the average distance between operating transponders is increased. The coupling between operating transponders is accordingly reduced. One method of achieving this is to introduce a random time delay between transponders moving from a low power non-operating state and a normal power operating state where a random number controls the length of the time and the average length of the time is set by the TRP. In this manner only a small portion of transponders are operating at any one time. The larger the average time the smaller the proportion of operating transponders. The TRP can set the average time by writing to control bits. These bits represent the "Power Mode Control" number. It is advantageous if the Power Mode Control is not lost during the periodic power outages caused by the sequential switching of the interrogation field. This is achieved if the Power Mode Control is stored in temporary memory, again, using a preferred embodiment of the invention.

The above description illustrates that the preferred embodiments of the invention provide many advantages over the prior art systems. In some embodiments these advantages arise from the provision of a plurality of RFID transponders for use with an RFID interrogator that provides a plurality of temporally spaced interrogating signals that include respective identifiers, where the transponders each include:

a receiver for receiving one or more of the interrogating signals;

a signal processor being responsive to the receiver for extracting the identifiers from the one or more signals; and a transmitter being responsive to the identifiers for transmitting a response signal for allowing the interrogator to determine the order in which the transponders were first in receipt of an interrogating signal.

It is inherent in the transponder/TRP system that both the transponder and the TRP have transmitters and receivers for allowing two way communication between the devices. However, the preferred embodiments of this invention go further and utilise the content and timing of the transmitted information between the devices in an advantageous and constructive manner. The preferred embodiments also make use of the on-board processing capability of the transponders, which includes, amongst other components, the signal processor mentioned above, a central processor and associated memory.

Although the invention has been described with reference to a number of specific embodiments and aspects, it will be appreciated that by those skilled in the art that the invention can be embodied in many other forms.

The invention claimed is:

1. A radio-frequency identification ("RFID") transponder, the RFID transponder including:

a volatile memory array for storing first data;

a power supply for powering circuitry associated with the RFID transponder, including the volatile memory array;

wherein when power ceases to be provided to the volatile memory array by the power supply, data in the volatile memory array is validly maintained therein for a predetermined time period;

wherein the volatile memory array is responsive to an interrogating signal for selectively updating the first data; and wherein the predetermined time period is determined by discharging of the volatile memory array through stray leakage paths within the volatile memory array.

2. The transponder according to claim 1 wherein:

the interrogating signal comprises an identifier; and the RFID transponder includes a receiver for receiving the interrogating signal.

3. The transponder according to claim 2, further comprising a signal processor that is responsive to:

a) the receiver for extracting the identifier from the interrogating signal; and b) the identifier and the first data for determining whether the identifier is stored in the volatile memory array.

4. The transponder according to claim 1 wherein the power supply provides power by converting an externally applied electromagnetic excitation field into electrical power.

5. The transponder according to claim 1, further comprising:
- a timer for providing a validity flag in response to the interrogating signal;
- wherein to flag is "valid" if the interrogating signal is received within a second time period;
- wherein the flag is "invalid" if the interrogating signal is received after the second time period; and
- wherein the data in the volatile memory array is maintained in a readable state until at least the expiration of the second time period.

6. The transponder according to claim 5 wherein the timer comprises a capacitive cell for storing a charge generated by current from the power supply, wherein once power from the power supply ceases to be supplied, the charge in the capacitive cell discharges at a predetermined rate.

7. The transponder according to claim 5 wherein a status of the validity flag is based on a voltage generated at a predetermined point in the timer, the voltage decaying as the capacitive cell discharges.

8. The transponder according to claim 7 wherein the voltage is an output voltage of the capacitive cell as it discharges through a load.

9. The transponder according to claim 8 wherein the capacitive cell is a memory cell.

10. The transponder according to claim 9 wherein the memory cell forms part of the volatile memory array.

11. An RFID system comprising:
- an RFID transponder according to claim 1; and
- a transponder interrogator for providing an interrogation field and reading data from the RFID transponder.

12. The system according to claim 11 wherein the interrogator sequentially switches an orientation of the interrogation field.

13. A method of using a radio-frequency identification ("RFID") transponder, the method including the steps of:
- storing data in a volatile memory array included within the RFID transponder;
- powering circuitry associated with the RFID transponder, including the volatile memory array, with a power supply;
- validly maintaining the data in the volatile memory array for a predetermined time period after power ceases to be provided to the volatile memory array by the power supply;
- being responsive to an interrogating signal for selectively updating the first data; and
- wherein the predetermined time period is determined by discharging of the volatile memory array through stray leakage paths within the volatile memory array.

14. The method according to claim 13 including the additional step of receiving the interrogating signal, the interrogating signal comprising an identifier, where in the RFID transponder includes a receiver for receiving the signal.

15. The method according to claim 14 wherein the RFID transponder includes a signal processor responsive to:
a) the receiver fix extracting the identifier from the interrogating signal; and
b) the identifier and the first data for determining whether the identifier is stored in the memory array.

\* \* \* \* \*

UNITED STATES PATENT AND TRADEMARK OFFICE
CERTIFICATE OF CORRECTION

PATENT NO. : 7,248,145 B2 Page 1 of 1
APPLICATION NO. : 10/204159
DATED : July 24, 2007
INVENTOR(S) : Stuart Colin Littlechild et al.

It is certified that error appears in the above-identified patent and that said Letters Patent is hereby corrected as shown below:

Title Page; item (73); The assignee name appearing as "Magellan Technology Oty Limited" on the cover sheet of the patent is corrected to read "Magellan Technology PTY Limited".

Signed and Sealed this

Seventeenth Day of February, 2009

JOHN DOLL
*Acting Director of the United States Patent and Trademark Office*